(12) United States Patent
Akhter et al.

(10) Patent No.: US 9,203,933 B1
(45) Date of Patent: Dec. 1, 2015

(54) METHOD AND APPARATUS FOR EFFICIENT DATA COMPRESSION IN A COMMUNICATION SYSTEM

(71) Applicant: Integrated Device Technology, Inc., San Jose, CA (US)

(72) Inventors: Mohammad Shahanshah Akhter, Ottawa (CA); Brian Scott Darnell, Suwanee, GA (US); Steve Lamontagne, Ottawa (CA); Bachir Berkane, Ottawa (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 194 days.

(21) Appl. No.: 14/012,944

(22) Filed: Aug. 28, 2013

(51) Int. Cl.
*H04L 29/06* (2006.01)
*H04W 28/06* (2009.01)

(52) U.S. Cl.
CPC ............... *H04L 69/04* (2013.01); *H04W 28/06* (2013.01)

(58) Field of Classification Search
USPC ........................................................ 370/252
See application file for complete search history.

(56) References Cited

U.S. PATENT DOCUMENTS

| | | | |
|---|---|---|---|
| 5,999,561 A | 12/1999 | Naden et al. | |
| 6,192,259 B1 | 2/2001 | Hayashi | |
| 6,226,325 B1 | 5/2001 | Nakamura | |
| 6,240,084 B1 | 5/2001 | Oran et al. | |
| 6,263,503 B1 | 7/2001 | Margulis | |
| 6,449,596 B1 | 9/2002 | Ejima | |
| 6,775,530 B2 | 8/2004 | Severson et al. | |
| 6,842,623 B2 | 1/2005 | Koskal | |
| 6,903,668 B1 | 6/2005 | Drorr et al. | |
| 7,009,533 B1 | 3/2006 | Wegener | |
| 7,088,276 B1 | 8/2006 | Wegener | |
| 7,142,519 B2 | 11/2006 | Saadeh et al. | |
| 7,519,383 B2 * | 4/2009 | Olgaard | 455/522 |
| 7,541,950 B2 | 6/2009 | Wegener | |
| 7,599,283 B1 * | 10/2009 | Varier et al. | 370/216 |

(Continued)

FOREIGN PATENT DOCUMENTS

WO 2005048625 A1 5/2005

OTHER PUBLICATIONS

CPRI Specification V4.1, Commmon Public Interface (CPRI); Interface Specification, Feb. 1, 2009, 75 pages.

(Continued)

*Primary Examiner* — Robert M Morlan
(74) *Attorney, Agent, or Firm* — Glass & Associates; Kenneth Glass

(57) ABSTRACT

A method and apparatus that compresses signal data to generate compressed signal data having a low latency jitter while maintaining an acceptable compression ratio and reasonable degradation, as is required by next generation systems. A method and apparatus for compressing data in a communication system by receiving uncompressed data at a compressor of the communication system, analyzing the uncompressed data at the compressor to estimate at least one compression parameter to be applied during the compression of the uncompressed data, compressing the uncompressed data utilizing the at least one estimated compression parameter, monitoring the performance level of the compressed data packet and adjusting the estimated compression parameter used to compress the uncompressed data if the compressed data packet does not exhibit a desired performance level.

16 Claims, 8 Drawing Sheets

(56) References Cited

U.S. PATENT DOCUMENTS

| | | | |
|---|---|---|---|
| 7,623,894 B2 | 11/2009 | Vaglica et al. | |
| 7,656,897 B2 | 2/2010 | Liu | |
| 7,680,149 B2 | 3/2010 | Liu et al. | |
| 7,706,477 B2 | 4/2010 | Larsson | |
| 7,835,435 B2 | 11/2010 | Soni et al. | |
| 7,852,797 B2 | 12/2010 | Kang et al. | |
| 7,899,410 B2 | 3/2011 | Rakshani et al. | |
| 7,924,949 B2 | 4/2011 | Larsson | |
| 7,961,807 B2 | 6/2011 | Kotecha et al. | |
| 8,005,152 B2 | 8/2011 | Wegener | |
| 8,018,910 B2 | 9/2011 | Jiang et al. | |
| 8,054,889 B2 | 11/2011 | Isu et al. | |
| 8,089,854 B2 | 1/2012 | Persico | |
| 8,165,100 B2 | 4/2012 | Sabat et al. | |
| 8,174,428 B2 | 5/2012 | Wegener | |
| 8,176,524 B2 | 5/2012 | Singh et al. | |
| 8,239,912 B2 | 8/2012 | Deng | |
| 8,340,021 B2 | 12/2012 | Okeeffe et al. | |
| 9,055,472 B2 | 6/2015 | Evans et al. | |
| 9,059,778 B2 | 6/2015 | Ling | |
| 2002/0055371 A1 | 5/2002 | Amon et al. | |
| 2002/0163965 A1* | 11/2002 | Lee et al. | 375/240.03 |
| 2004/0004943 A1 | 1/2004 | Kim | |
| 2004/0062392 A1 | 4/2004 | Morton | |
| 2004/0082365 A1 | 4/2004 | Sabach et al. | |
| 2004/0198237 A1 | 10/2004 | Abutaleb et al. | |
| 2005/0104753 A1 | 5/2005 | Dror et al. | |
| 2005/0134907 A1 | 6/2005 | Obuchi et al. | |
| 2005/0169411 A1 | 8/2005 | Kroeger | |
| 2006/0233446 A1* | 10/2006 | Saito et al. | 382/232 |
| 2007/0076783 A1 | 4/2007 | Dishman et al. | |
| 2007/0116046 A1 | 5/2007 | Liu et al. | |
| 2007/0149135 A1 | 6/2007 | Larsson et al. | |
| 2007/0160012 A1 | 7/2007 | Liu | |
| 2007/0171866 A1 | 7/2007 | Merz et al. | |
| 2007/0293180 A1* | 12/2007 | Rahman et al. | 455/296 |
| 2009/0149221 A1 | 6/2009 | Liu et al. | |
| 2010/0067366 A1 | 3/2010 | Nicoli | |
| 2010/0202311 A1 | 8/2010 | Lunttila et al. | |
| 2010/0246642 A1 | 9/2010 | Walton et al. | |
| 2010/0285756 A1 | 11/2010 | Nakazawa | |
| 2011/0280209 A1 | 11/2011 | Wegener | |
| 2012/0008696 A1 | 1/2012 | Wegener | |
| 2012/0014421 A1 | 1/2012 | Wegener | |
| 2012/0014422 A1 | 1/2012 | Wegener | |
| 2012/0057572 A1 | 3/2012 | Evans | |
| 2012/0183023 A1 | 7/2012 | Filipovic et al. | |
| 2012/0202507 A1 | 8/2012 | Zhang et al. | |
| 2012/0207206 A1* | 8/2012 | Samardzija et al. | 375/240 |
| 2012/0250740 A1 | 10/2012 | Ling | |
| 2012/0328121 A1 | 12/2012 | Truman et al. | |

OTHER PUBLICATIONS

OBSAI Open base Station Architecture Initiative BTS System Reference document Ver. 2.0, Apr. 27, 2006, 151 pages.

OBSAI Open Base Station Architecture Initiative Reference Point 3 Specification Ver. 4.0, Mar. 7, 2007, 119 pages.

K. I. Pendersen. "Frequency domain scheduling for OFMA with limited and noisy channel feedback" 2007 IEEE 66th Vehicular Technology Conference. pp. 1792-1796, Oct. 3, 2007., see section II. C.

Maruyama, S. et al., "Base Transceiver Station for W-CDMA System," Fujitsu Sci. Tech. J. 38,2, p. 167-73, Dec. 2002.

* cited by examiner

METHOD AND APPARATUS FOR EFFICIENT DATA COMPRESSION IN A COMMUNICATION SYSTEM

BACKGROUND OF THE INVENTION

Transceiver systems in wireless communication networks perform the control functions for directing signals among communicating subscribers, or terminals, as well as communication with external networks. Transceiver systems in wireless communications networks include radio base stations and distributed antenna systems (DAS). For the reverse link, or uplink, a terminal transmits the RF signal received by the transceiver system. For the forward link, or downlink, the transceiver system transmits the RF signal to a subscriber, or terminal, in the wireless network. A terminal may be fixed or mobile wireless user equipment unit (UE) and may be a wireless device, cellular phone, personal digital assistant (PDA), personal computer or other device equipped with a wireless modem.

The rapid increase in data (e.g., video) communication and content consumption has led to expansion of wireless communication networks. As a result, the introduction of next generation communication standards (e.g., 3GPP LTE-A, IEEE 802.16m) has led to improved techniques for data processing, such as carrier aggregation (e.g., 100 MHz) with 8×8 MIMO (Multiple-Input, Multiple-Output) and CoMP (Co-Operative Multi-Point). This in turn has created the need for radio access networks capable of handling wider bandwidths and an increasing number of antennas. These radio access networks will require a higher numbers of fiber links to connect the base stations to the remote radio units. In addition, it is desirable to provide carrier aggregation with Multiple-Input and Multiple-Output (MIMO) and Co-Operative Multipoint (CoMP) techniques to significantly increase spectral efficiency. The implementation of Co-Operative Multipoint techniques requires communication between the baseband units and requires an increasing number of optical or wireless links between the baseband units and the radio units to support the increased data rate achievable with these improved transmission schemes. The increasing number of links required for these techniques results in an undesirable increased infrastructure cost.

Compression techniques can be used to reduce the infrastructure cost by reducing the number of optical or wireless links required to transmit the data as well as by optimizing resources. However, utilizing the compression techniques currently known in the art, it is difficult to achieve an average compression ratio with reasonable signal degradation while also keeping the latency jitter low. Compression techniques known in the art are unable to adjust to the continually changing signal behavior and as such, suffer from very high latency jitter.

While there are compression techniques currently known in the art to improve the data transmission rate of the communication system, the existing compression techniques utilize predetermined compression parameters that do not address the changing signal behavior of the received signals. As such, it is difficult for the known compression techniques to achieve an average compression ratio with reasonable degradation when the signal behavior changes rapidly.

Accordingly, there is a need for a method and apparatus for data compression that adapts to the continually changing, and often unpredictable, behavior of the received data signal over time, thereby providing a compressed data signal having a reasonable level of latency jitter and an acceptable level of performance degradation.

SUMMARY OF THE INVENTION

The present invention provides a method and apparatus that will allow for the significantly higher data rate necessary for the implementation of carrier aggregation with MIMO and co-operative multipoint (CoMP) in next generation communication standards, such as 3GPP, LTE-A and IEEE 802.16m. With the present invention, the data rate is reduced utilizing a novel compression scheme based upon feedforward estimation and decision based upon the signal characteristics and feedback parameters. The system and method of the present invention will increase effective link data rate while maintaining low latency and low latency jitter.

In operation, a method for compressing data in a communication system includes, receiving an uncompressed data packet at a compressor of a communication system, the uncompressed data packet comprising a plurality of signal samples. The method further includes analyzing the plurality of signal samples to estimate at least one compression parameter to be applied during the compression of the uncompressed data packet. The method further includes, compressing the uncompressed data packet using the at least one compression parameter to generates a compressed data packet, monitoring a performance level of the compressed data packet to determine if the compressed data packet exhibits a desired performance level, identifying at least one compression adjustment parameter if the compressed data packet does not exhibit the desired performance level, and adjusting the at least one compression parameter using the compression adjustment parameter if the compressed data packet does not exhibit the desired performance level. In accordance with the present invention, if the compressed data packet does not exhibit a desired performance level, the adjusted compression parameters are used to compress the next data packet received at the compressor.

The compression parameter estimation module may further be configured to analyze the plurality of signal samples to estimate at least one compression parameter by performing, in parallel, filtering each of the plurality of signal samples through one of a plurality of filters, encoding each of the plurality of filtered signal samples using one of a plurality of encoders, calculating entropy and entropy reduction for each of the plurality of filtered, encoded signal samples using one of a plurality of entropy calculation and reduction modules and identifying the combination of filtering, encoding and entropy calculation and reduction that most closely meets a desired performance level to estimate the least one compression parameter.

The compression parameters may include a signal gain parameter, an encoding parameter, a filter parameter and an entropy reduction value parameter.

The compression adjustment parameters may include a buffer level and a number of bits per sample of the compressed packet.

A compressor in accordance with the present invention may include a compression parameter estimation module configured to receive an uncompressed data packet at a compressor of a communication system and configured to analyze the signal samples of the data packet to estimate at least one compression parameter to be applied during the compression of the uncompressed data packet. The compressor may further include a compressed data packet generator coupled to the compression parameter estimation module configured to compress the uncompressed data packet using the at least one compression parameter and configured to generate a compressed data packet. The compressor may further include a performance level monitor coupled to the compressed data packet generator and to the compression parameter estimation module, the performance level monitor configured to monitor the performance level of the compressed data packet to determine if the compressed data packet exhibits a desired performance level, configured to identify at least one compression adjustment parameter if the compressed data packet does not exhibit the desired performance level and configured to provide the compression adjustment parameters to the compression parameter estimation module if the compressed data packet does not exhibit the desired performance level. With the compressor of the present invention, the compression parameter estimation module is further configured to adjust the at least one compression parameter using the compression adjustment parameters from the performance level monitor if the compressed data packet does not exhibit the desired performance level.

The present invention provides a method and apparatus for data compression that adapts to the continually changing, and often unpredictable, behavior of the received data signal over time, thereby providing a compressed data signal having a reasonable level of latency jitter and an acceptable level of performance degradation.

The compression parameter estimation module of the compressor may further include a filter module comprising a plurality of filters, the filter module configured to filter each of the plurality of signal samples through one of the plurality of filters, in parallel, a plurality of encoders, each of the plurality of encoders configured to encode each of the plurality of filtered signal samples using one of a plurality of encoders, in parallel, a plurality of entropy calculation and reduction modules, each of the plurality of entropy calculation and reduction modules to calculate entropy and entropy reduction for each of the plurality of filtered, encoded signal samples using one of a plurality of entropy calculation and reduction modules and an analysis and decision module configured to identify the combination of filtering, encoding and entropy calculation and reduction that most closely meets a desired performance level to estimate the at least one compression parameter.

A compression module for compressing data in a communication system, in accordance with the present invention, may include a compressor including a compression parameter estimation module configured to receive an uncompressed data packet at a compressor of the communication system, configured to analyze the signal samples of the data packet to estimate at least one compression parameter to be applied during the compression of the uncompressed data packet. The compressor may further include a compressed data packet generator coupled to the compression parameter estimation module, the compressed data packet generator configured to compress the uncompressed data packet using the at least one compression parameter to generate a compressed data packet. The compression module may further include a performance level monitor coupled to the compressed data packet generator and to the compression parameter estimation module, the performance level monitor configured to monitor the performance level of the compressed data packet to determine if the compressed data packet exhibits a desired performance level, configured to identify at least one compression adjustment parameter if the compressed data packet does not exhibit the desired performance level and configured to provide the compression adjustment parameters to the compression parameter estimation module if the compressed data packet does not exhibit the desired performance level. The compression module may further include a decompressor configured to decompress the compressed data packet at the decompressor using the compression parameters or the adjusted compression parameters. In the present invention, the compression parameter estimation module of the compressor adjusts the at least one compression parameters using the compression adjustment parameters from the performance level monitor if the compressed data packet does not exhibit the desired performance level.

DESCRIPTION OF THE INVENTION

The modular design approach for radio transceiver systems, wherein the baseband processing is separated from the radio frequency processing, has led the industry to develop interface standards. One example of a standard interface for the data transfer interfaces between the radio units and baseband units of transceiver systems is the Common Public Radio Interface (CPRI). Connection topologies between the baseband unit and one or more remote radio units include point-to-point, multiple point-to-point, chain, star, tree, ring and combinations thereof. Another example of an interface specification for modular architecture of radio transceiver systems is the Open Base Station Architecture Initiative (OBSAI). The OBSAI specification describes alternative protocols for the interconnection of baseband modules and remote radio units analogous to the CPRI specification, as well as data transfer protocols for the serial data links.

In conventional cellular communication systems, radio coverage is provided for a given geographic area via multiple base stations distributed throughout the geographic area involved. In this way, each base station can serve traffic in a smaller geographic area. Consequently, multiple base stations in a wireless communication network can simultaneously serve users in different geographic areas, which increases the overall capacity of the wireless network involved.

In order to further increase the capacity of wireless systems, each base station may be configured to support radio coverage in multiple sectors. For example, a base station in a conventional cellular system may be configured to provide radio coverage in one sector, three sectors or six sectors. In those systems employing multiple sectors per base station, each sector can handle part of the traffic in an additional smaller geographic area, which increases the overall capacity of the wireless network involved. Each of the sectors may include multiple remote radio units in communication with each of the base stations. Each of the radio units may further include multiple antennas for both receiving and transmitting data between the radio unit and the user of the communication system.

As described, communication systems are known in the art to include a baseband unit for performing signal processing in communication with a remote radio unit for receiving and transmitting signals to an antenna. The present invention provides a method and apparatus for an efficient compression solution implemented in a data compressor of a communication system.

Figure 1:
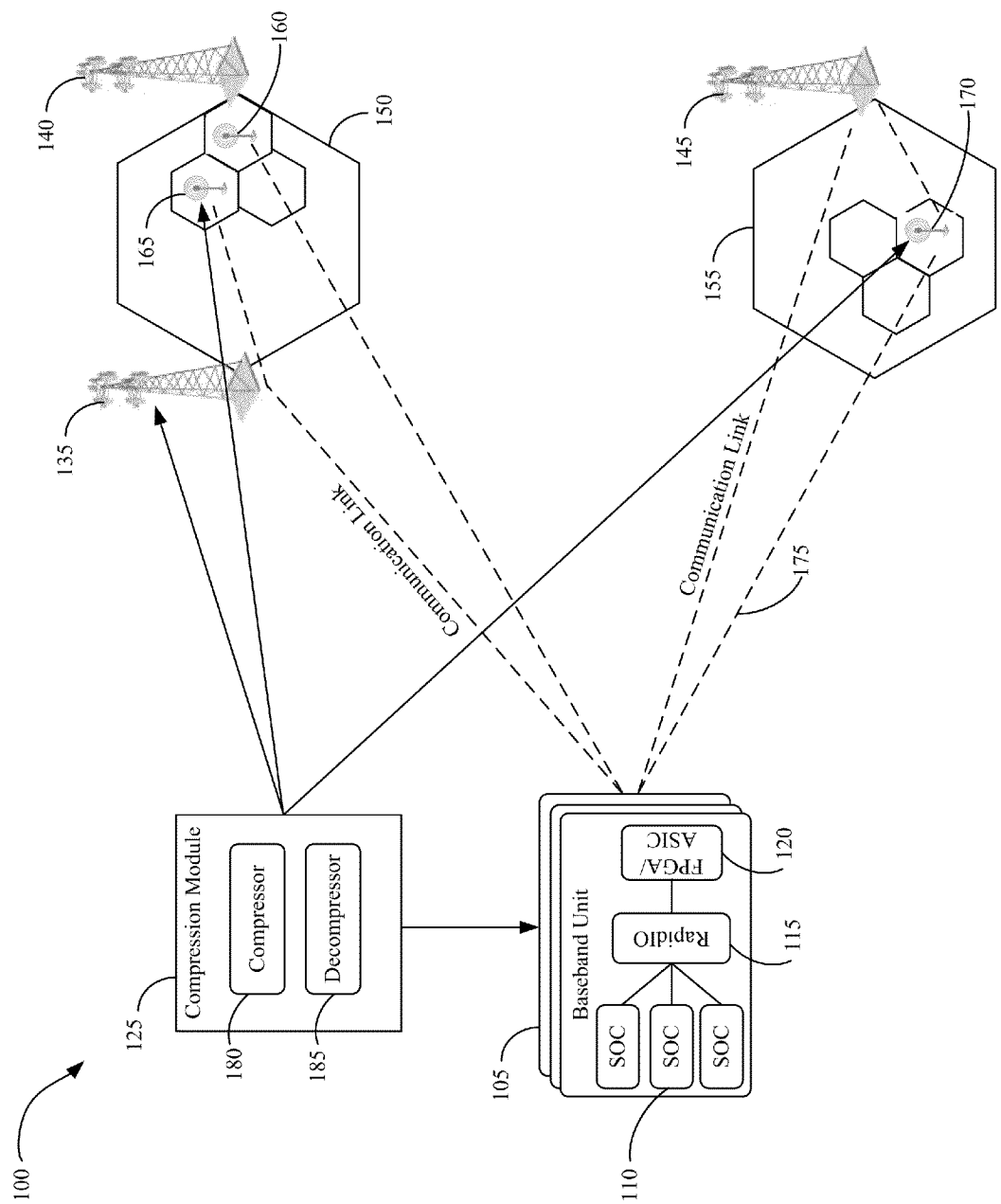
FIG. 1 is an illustration of a communication system architecture in accordance with an embodiment of the present invention.

FIG. 1 illustrates a typical usage of compression and decompression in a radio access network communication system. With reference to FIG. 1, in a centralized radio access network communication system 100, remote radio units 135, 140, 145, 160, 165, 170 may include one or more antennas that may be used to transmit radio frequency data to a user or to receive radio frequency data from a user. Each of the remote radio units is responsible for providing a communication signal within a predetermined coverage area 150, 155. In a particular embodiment, the coverage area may be defined by a macro cell with a small cell overlay. The remote radio units 135, 140, 145, 160, 165, 170 may be coupled to a baseband unit 105 and to each other through a communication link 175. The communication link 175 may be a wireless, wired or optical link. In a particular embodiment, the connection may be a wired CPRI link. The baseband unit 105 may include a plurality of baseband cards and each baseband card may further include a control processor 110 implemented in an SOC (System on a Chip) additional signal processing circuitry 120 implemented in an FPGA or ASIC and a RapidIO interface 115 between the control processor 110 and the signal processing circuitry 120. The control circuit and signal processing circuitry may perform signal processing functions to modulate communication data that were extracted from previously received wireless signals or signals received from an external network to produce digital signals. The signal processing functions depend on the modulation format and can include symbol modulation, channel coding, spreading for CDMA, diversity processing for transmission, time and frequency synchronization, upconverting, multiplexing, and inverse fast Fourier transformation for OFDM. A compression module 125 may be implemented within the baseband unit 105 and/or at one or more of the remote radio units 135, 140, 145, 160, 165, 170. The compression module 125 may include both a compressor 180 and a decompressor 185. The compression module 125 is responsible for compressing the signal samples to be transmitted over the communication link 175 and for decompressing the received signal after transmission over the communication link 175. The compressor 180 and decompressor 185 may be integrated into one circuit, or the compressor 180 and 185 may be separate circuits.

In a particular embodiment, the signal samples may be compressed at the baseband unit 105 prior to being transmitted to one or more of the remote radio units 135, 140, 145, 160, 165, 170, where the compressed signal samples are then decompressed. Alternatively, the signal samples may also be compressed at the remote radio unit 135, 140, 145, 160, 165, 170, prior to being transmitted to the baseband unit 105, where the compressed signal samples are then decompressed.

In the present invention, the compressor 180 is used to compress the signal samples prior to transmission over the communication link 175 to increase the data throughput of the communication system. Compressing the data prior to transmission over the wireless link also allows for a reduction in the number of antennas that are necessary to transmit the signal samples between the baseband unit 105 and the remote radio units 135, 140, 145, 160, 165, 170.

The radio units 135, 140, 145, 160, 165, 170 may be operating in the same sector or in different sectors. In operation, the radio units 135, 140, 145, 160, 165, 170 may receive data from the baseband unit 105, or from another one of the radio units 135, 140, 145, 160, 165, 170.

In a communication system operating in an uplink mode, radio frequency data is received from a user at an antenna associated with a remote radio unit 135, 140, 145, 160, 165, 170 to be transmitted to a baseband unit 105. The radio frequency data received at the remote radio unit is sampled and converted to digital data and additional data processing may be applied to the data at the radio unit 135, 140, 145, 160, 165, 170. The data is then compressed at the compression module 125 of the radio unit 135, 140, 145, 160, 165, 170 and then transmitted from the radio unit 135, 140, 145, 160, 165, 170 to the baseband unit 105 for further processing.

In a communication system operating in a downlink mode, data may be transmitted from the baseband unit 105 to a remote radio unit 135, 140, 145, 160, 165, 170 for subsequent transfer of the data to a user via an antenna in communication with the remote radio unit 135, 140, 145, 160, 165, 170. The signal samples received at the baseband unit 105 are converted to digital data and additional data processing may be applied to the signal samples at the baseband unit 105. The signal samples are then compressed at the compression module 125 of the baseband unit 105 and then transmitted from the baseband unit 105 to one or more of the remote radio units 135, 140, 145, 160, 165, 170 for further processing.

Figure 2:
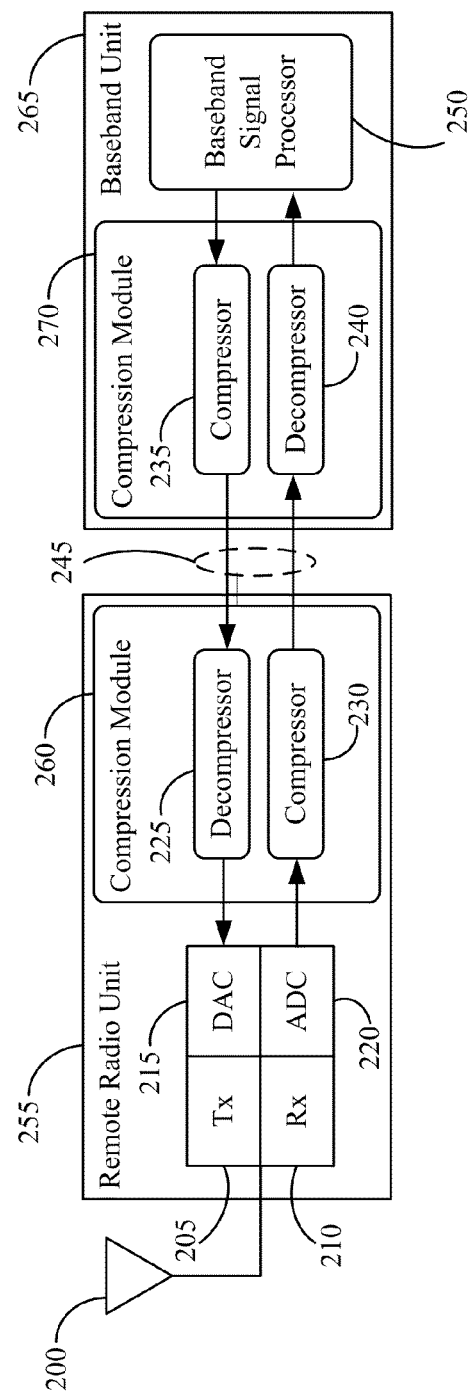
FIG. 2 is a block diagram illustrating a general base station architecture that incorporates compression and decompression.

FIG. 2 is a block diagram illustrating a general communication system architecture that incorporates compression and decompression. With reference to FIG. 2, the communication system architecture includes a baseband unit 265 connected by one or more serial bi-directional communication links 245 to a remote radio unit 255. This general architecture can be used for any air interface standard employed by wireless communication networks, including GSM/EDGE, CDMA based modulation formats, OFDM base modulation formats such as WiMax or LTE and other signal modulation formats that may evolve. The remote radio unit 255 may be located near the antenna 200 on an antenna tower. The remote radio unit 255 may be connected to multiple antennas for transmission, reception, diversity or beamforming. The serial communication link 245 may be implemented by fiber optic, coaxial cable or RJ-45 twisted pair, microwave or millimeter (mm-Wave) technology. The baseband unit 265 performs signal processing functions to prepare data for transmission by the remote radio unit 255 or recovers data from signal samples received from the remote radio unit 255. The signal processing functions performed by the baseband unit 254 may include symbol modulation/demodulation, channel coding/decoding, spreading/de-spreading for CDMA, diversity processing for transmission/reception, interference cancellation, equalization, time and frequency synchronization, upconverting/downconverting, multiplexing/demultiplexing and data transport to/from an external network.

For the transmit path, or downlink, the baseband signal processor 250 of the baseband unit 265 performs the signal processing functions to modulate communication data that were extracted from previously received wireless signals or received from an external network to produce digital signals. The signal processing functions depend on the modulation format and can include symbol modulation, channel coding, spreading for CDMA, diversity processing for transmission, time and frequency synchronization, upconverting, multiplexing and inverse discrete Fourier transformation for OFDM. The compressor 235 of the compression module 270 compresses the samples of the digital signal prior to transfer over a communication link 245 to the remote radio unit 255. At the remote radio unit 255, the decompressor 225 of the compression module 260 decompresses the compressed samples to reconstruct the digital signal before digital to analog conversion. Alternatively, the digital signal may be processed by a signal processor prior to digital to analog conversion. The digital to analog converter (DAC) 215 of the remote radio unit 255 converts the reconstructed digital signal to an analog signal. The transmitter (Tx) 205 prepares the analog signal for transmission by the antenna 200, including up-conversion to the appropriate radio frequency, RF filtering and amplification.

For the receive path, or uplink, antenna 200 at the remote radio unit 255 receives an RF analog signal representing modulated communication data from one or more wireless sources, or subscribers. The frequency band of the received signal may be a composite of transmitted signals from multiple wireless subscribers. Depending on the air interface protocol, different subscriber signals can be assigned to certain frequency channels or multiple subscribers can be assigned to a particular frequency band. The receiver (Rx) 210 of the remote radio unit 255 performs analog operations of the RF analog signal, including RF filtering, amplification and down-conversion to shift the center frequency of the received signal. The analog to digital converter (ADC) 220 of the remote radio unit 255 converts the received analog signal to a digital signal to produce signal samples that have only real values, or alternatively, have in phase (I) and quadrature (Q) components, based upon the system design. The compressor 230 of the remote radio unit 255 applies compression to the digital signal samples before transmission over the communication link 245. At the baseband unit 265, the decompressor 240 of the compression module 270 decompresses the compressed samples to reconstruct the digital signal prior to performing the normal signal processing at the baseband signal processor 250 to recover communication data from the decompressed digital signal. The processing operations may include demodulating symbols, channel decoding, dispreading (for CDMA modulation formats), diversity processing, interference cancelling, equalizing, time and frequency synchronization, downconverting, demultiplexing, discrete Fourier transformation (for OFDM modulation formats) and transporting data derived from the decompressed signal samples to an external network.

Figure 3:
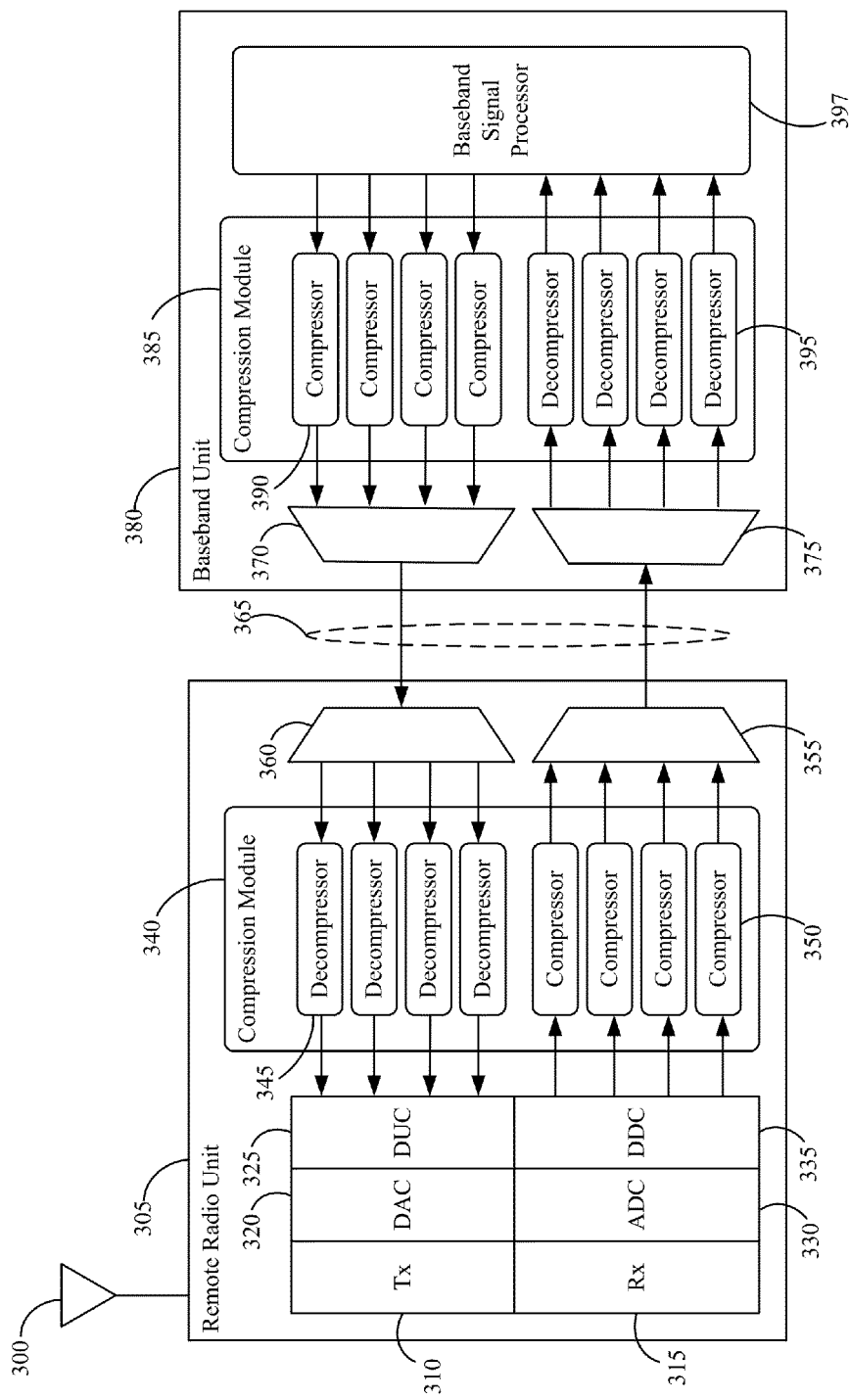
FIG. 3 is a block diagram illustrating compression and decompression where multiple signal channels are compressed and multiplexed before transfer over a communication link.

FIG. 3 is a block diagram of compression and decompression in accordance with the present invention, wherein multiple signal channels are compressed and multiplexed before transfer over a communication serial data link. Both OBSAI and CPRI transceivers may receive and transmit multiple frequency channels of signal samples for each independent antenna, or multiple antenna-carriers. With reference to FIG. 3, there are four channels of signal samples representing four antenna-carriers. The signal samples comprise baseband I and Q samples. For the transmit path, each compressor 390 of the compression module 385 at the baseband unit 380 independently compresses a stream of baseband I, Q signal samples to form corresponding streams of compressed samples. The multiplexer 370 multiplexes the compressed samples into a single serial data stream for transfer over serial data communication link 365 in accordance with the standard. At the remote radio unit 305, the demultiplexer 360 demultiplexes the serial data stream to recover the four streams of compressed samples in accordance with the standard. At the remote radio unit 305, each decompressor 345 of the compression module 340 decompresses one stream of compressed samples to reconstruct the corresponding baseband I, Q signal samples. The digital upconverter (DUC) 325 of the remote radio unit 305 upconverts each stream of decompressed signal samples to respective carrier frequencies to form a channelized signal. Each upconverted digital signal may occupy a particular channel of the resulting channelized signal. The digital to analog converter (DAC) 320 of the remote radio unit 305 converts the channelized signal to an analog signal. The transmitter 310 of the remote radio unit 305 converts the analog signal to the appropriate RF frequency for transmission by the antenna 300.

Additionally, with reference to FIG. 3, for the receive path, the receiver (Rx) 315 of the remote radio unit 305 receives the RF signal and the ADC 330 digitizes the received signal to produce a digital signal that represents a channelized signal data as previously described for the transmit path. The digital down converter (DDC) 335 of the remote radio unit down-converts each channel to form corresponding streams of baseband I, Q signal samples, one for each channel. The compressors 350 of the compression module 340 compress the received signal samples to form compressed samples. The multiplexer 355 multiplexes the streams of compressed samples output from the compressors 350 to form a serial data stream in accordance with the OBSAI or CPRI standards. The serial data stream is transferred via the serial data communication link 365 to the baseband unit 380. The demultiplexer 375 at the baseband unit 380 demultiplexes the serial data to restore the four streams of compressed samples. Each decompressor 395 of the compression module 385 reconstructs the corresponding I, Q signal samples prior to performing normal operations by the baseband signal processor 397.

Figure 4:
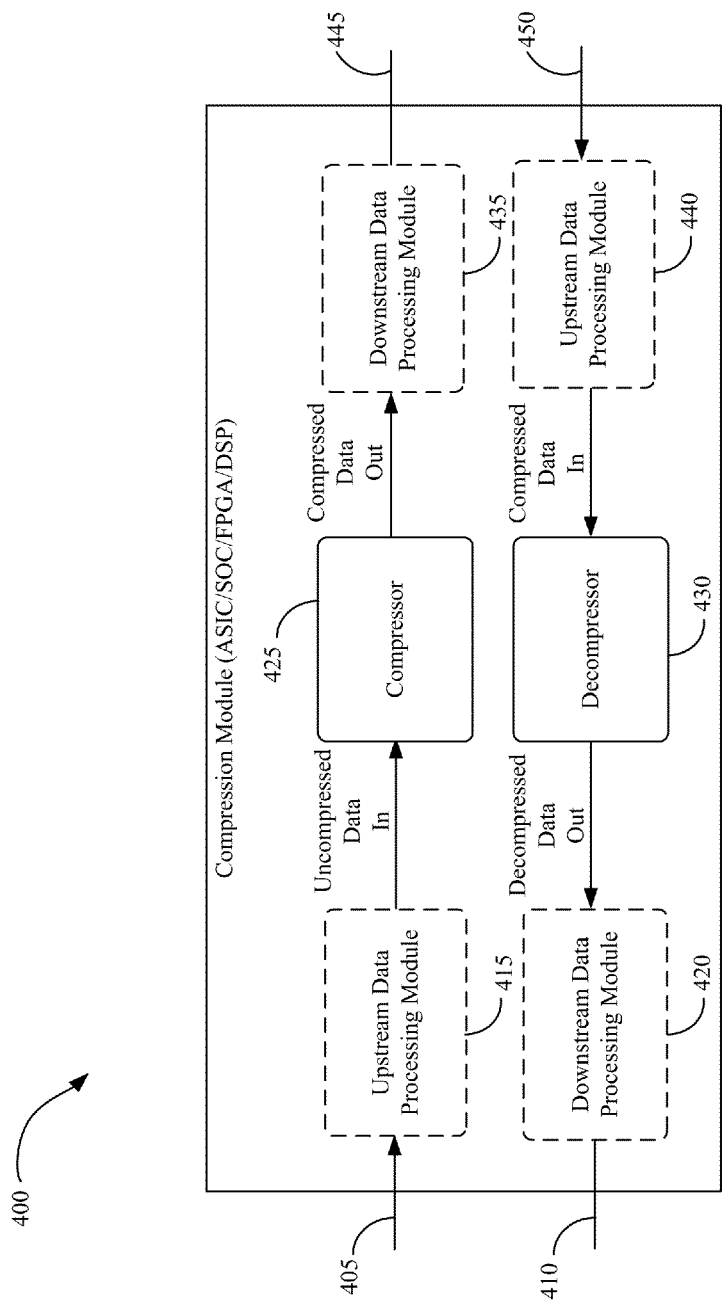
FIG. 4 is a block diagram illustrating a compression module that includes a compressor and a decompressor in accordance with an embodiment of the present invention.

With reference to FIG. 4, a compression module 400 in accordance with the present invention may be implemented in an ASIC, SOC, FPGA or DSP, as previously described. The compression module 400 may be located at the baseband unit or alternatively at one or more of the remote radio units. In an additional embodiment, a compression module 400 may be located at both the baseband unit and at one or more of the remote radio units. The compression module 400 may include a compressor 425, a decompressor 430, one or more upstream data processing modules 415, 440 and one or more downstream processing modules 420, 435.

In a particular embodiment, the compression module is located at the baseband unit. In a downlink mode of operation, signal samples 405 to be transmitted to one or more of the remote radio units may be processed at the baseband unit. The compression module 400 at the baseband unit may preprocess the signal data utilizing an upstream data processing module 415. The preprocessed data from the upstream data processing module 415 may then be transmitted to a compressor 425. The compressor 425 may then compress the signal data and provide the compressed signal data to a downstream data processing module 435 for additional processing prior to transmitting the compressed signal 445 to the remote radio units. In an uplink mode of operation, compressed signal data 450 may be received at the compression module 400 located at the baseband unit from one or more of the remote radio units. An upstream data processing module 440 may preprocess the compressed signal data received from the remote radio units prior to providing the compressed data to the decompressor 430 of the baseband unit. The decompressor 430 may then decompress the compressed signal data. The decompressed signal data may then be provided to a downstream data processing module 420 for additional processing prior to transmitting the decompressed signal data 410 from the compression module 400 of the baseband unit.

In an additional embodiment, the compression module 400 may be located at one of the remote radio units. In this embodiment, in an uplink mode of operation, signal data 405 to be transmitted to the baseband unit from one or more of the remote radio units may be received from an end user or subscriber. The compression module 400 of the remote radio unit may preprocess the signal data utilizing an upstream data processing module 405. The preprocessed data from the upstream data processing module 405 may then be transmitted to a compressor 425. The compressor 425 may then compress the signal data and provide the compressed signal samples to a downstream data processing module 435 for additional processing prior to transmitting the compressed signal 445 to the baseband unit. In a downlink mode of operation, compressed signal data 450 may be received at one or more of the remote radio units from the baseband unit. An upstream data processing module 440 may preprocess the compressed signal data received from the baseband unit prior to providing the compressed data to the decompressor 430 of the compression module 400. The decompressor 430 may then decompress the compressed signal samples. After decompression, the decompressed signal samples may be provided to a downstream data processing module 420 for additional processing prior to transmitting the decompressed signal data 410 from the compression module 400 of the remote radio unit.

Figure 5:
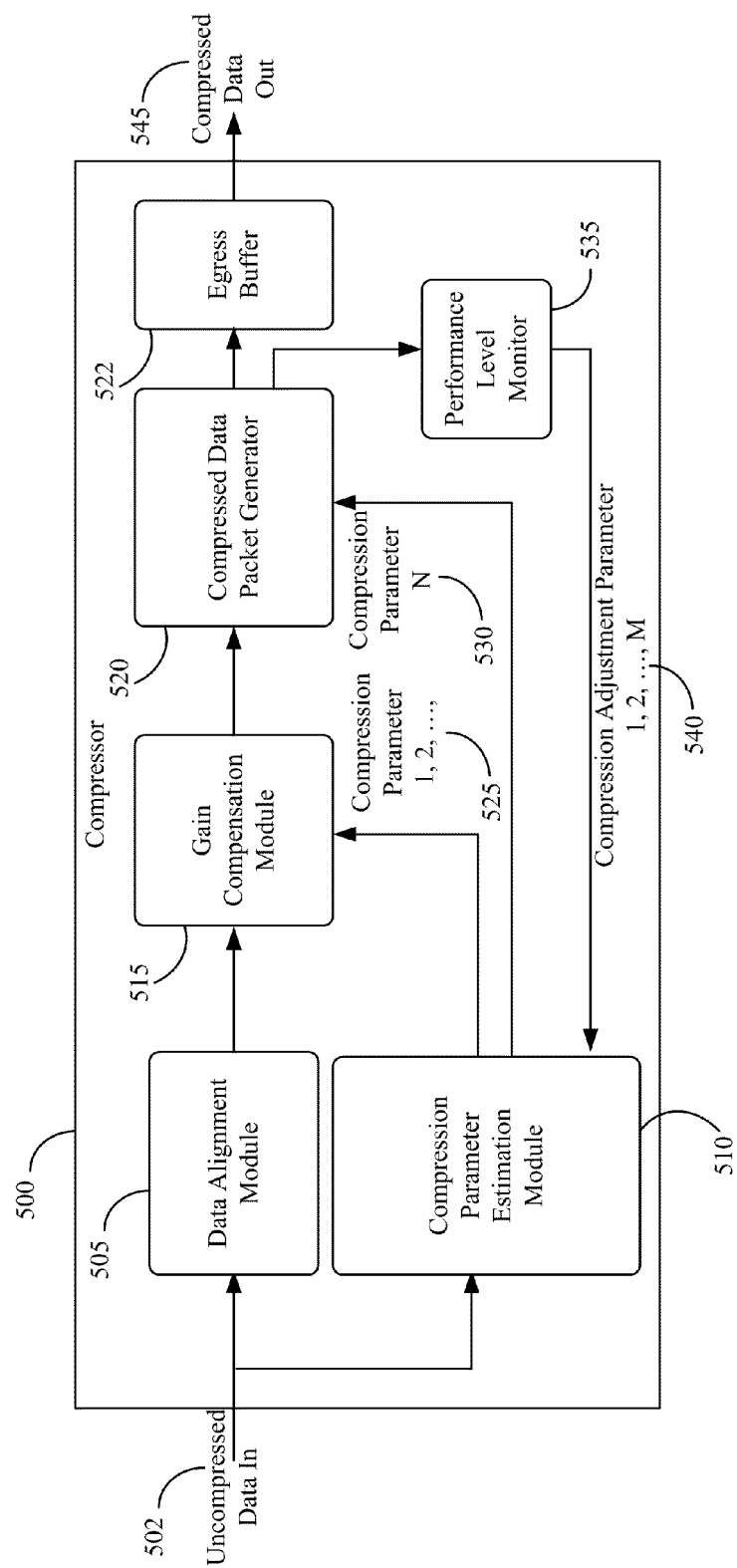
FIG. 5 is a block diagram illustrating a compressor in accordance with an embodiment of the present invention.

With reference to FIG. 5, the compressor 500 in accordance with the present invention combines feedforward processing and feedback processing of the uncompressed data 502 to adjust the compression parameters used in the generation of the compressed data 545, thereby achieving an average compression ratio with reasonable degradation of the signal while also keeping the latency jitter to a reasonable level.

In accordance with the present invention, the feedforward processing of the compressor 500 is provided by the data alignment module 505 and the compression parameter estimation module 510. On a packet-by-packet basis, the uncompressed data 502 is processed through the data alignment module 505 and the compression parameter estimation module 510. The data packet comprises a plurality of signal samples as previously described. The compressed data packet may comprise a header and a data portion or data payload positioned between the header and the footer. The data packet may further comprise information relevant to error checking functions. The data alignment module 505 analyzes various portions of the data packet and aligns the packet so as to facilitate subsequent processing of the data packet. The compression parameter estimation module 510 analyses the signal characteristics of the signal samples of the data packet and estimates at least one compression parameter to be applied to the data packet during the subsequent compression of the data packet. In the present invention, the compression parameter estimation module 510 estimates the compression parameters to be used for every data packet to obtain a desired compression ratio and acceptable degradation. The compression estimation module 510 may estimate parameters to control the scaling of the signal samples of the data packet, the filtering scheme for the compression of the data packet and the encoding algorithm to be used during the compression of the data packet. The estimated compression parameters are determined based upon the analysis of the received signal samples of the data packet. The estimated compression parameters may include, but are not limited to, an estimated signal gain for the data packet, an estimated encoding for the data packet and desired entropy reduction values for the data packet. The selected estimated compression parameters 525, 530 and may then be provided to the gain compensation module 515 and to the compressed data packet generator 520. After the uncompressed data 502 has been aligned by the data alignment module 505, the aligned data may be transmitted to the gain compensation module 515 and the compressed data packet generator 520 on a packet-by-packet basis. The estimated compression parameters 525, 530 may then be used to adjust the gain of the data packet and to compress the data packet. In an exemplary embodiment, the gain compensation module 515 may receive an estimated attenuation parameter from the compression parameter estimation module 510 and the attenuation parameter may be used to reduce the amplitudes of the frequency domain coefficients of the data packet during the compression of the data packet, resulting in a lossy compression. The compressed data packet may then be stored in the egress buffer 522 prior to transmission of the compressed data 545 from the compressor 500.

After the compressed data packet has been generated, the performance level of the data packet is monitored by the performance level monitor 535 to determine if the compressed data packet exhibits a desired performance level. The desired performance level may be an adjustable and programmable parameter. The performance level monitor 535 may measure specific performance parameters of the data packet, which may include a compression ratio, a latency or latency jitter, a number of bits per sample from the previous data packet or an egress buffer level. Based upon the results of the data packet measurements performed by the performance level monitor 535, the compressor may determine whether or not the desired performance level of the data packet has been achieved during the generation of the compressed data packet. If the data packet exhibits the desired performance level, the compressed data packet 545 may be transmitted from the compressor 500 and the same compression parameters 525, 530 may be used to generate the next compressed data packet. However, if the data packet does not exhibit the desired performance level, the performance level monitor 535 may utilize the measurements performed on the data packet to identify one or more compression adjustment parameters 540 to be provided to the compression parameter estimation module 510 to adjust the compression parameters used in the compression of the next data packet. In an exemplary embodiment, the attenuation parameter used to reduce the amplitudes of the frequency domain coefficients of the current packet may be adjusted to change the amount of amplitude reduction of the frequency domain coefficients of the next data packet during the compression process. As such, a feedback path is established wherein the performance level monitor 535 determines if the compression parameters 525, 530 used to compress the data packet achieve a desired compression and performance level and if not, one or more compression adjustment parameters 540 associated with the current data packet may be provided to the compression parameter estimation module 510 to adjust the compression parameters 525, 530 used during the compression of the next data packet. As such, in the present invention, the generation of the compressed data packet is based upon the feedforward path provided by the data alignment module 505 and the compression parameter estimation module 510 and the feedback path provided by the compensation module 515, the compressed data packet generator 520 and the performance level monitor 535. The combination of the feedforward path and the feedback path allows the compressor of the present invention to establish compression parameters and to adaptively adjust the compression parameters on a packet-by-packet basis. Such an approach maintains the latency jitter at an acceptable level while also keeping the performance degradation of the signal data at a reasonable level as the signal behavior continually changes over time.

The compressed data packets 545 generated by the compressor 500 may then be transmitted via a CPRI or OBSAI link between the baseband unit and one or more of the remote radio units. As previously discussed, the compressor 500 may be located at the baseband unit and/or at one or more of the remote radio units.

Figure 6:
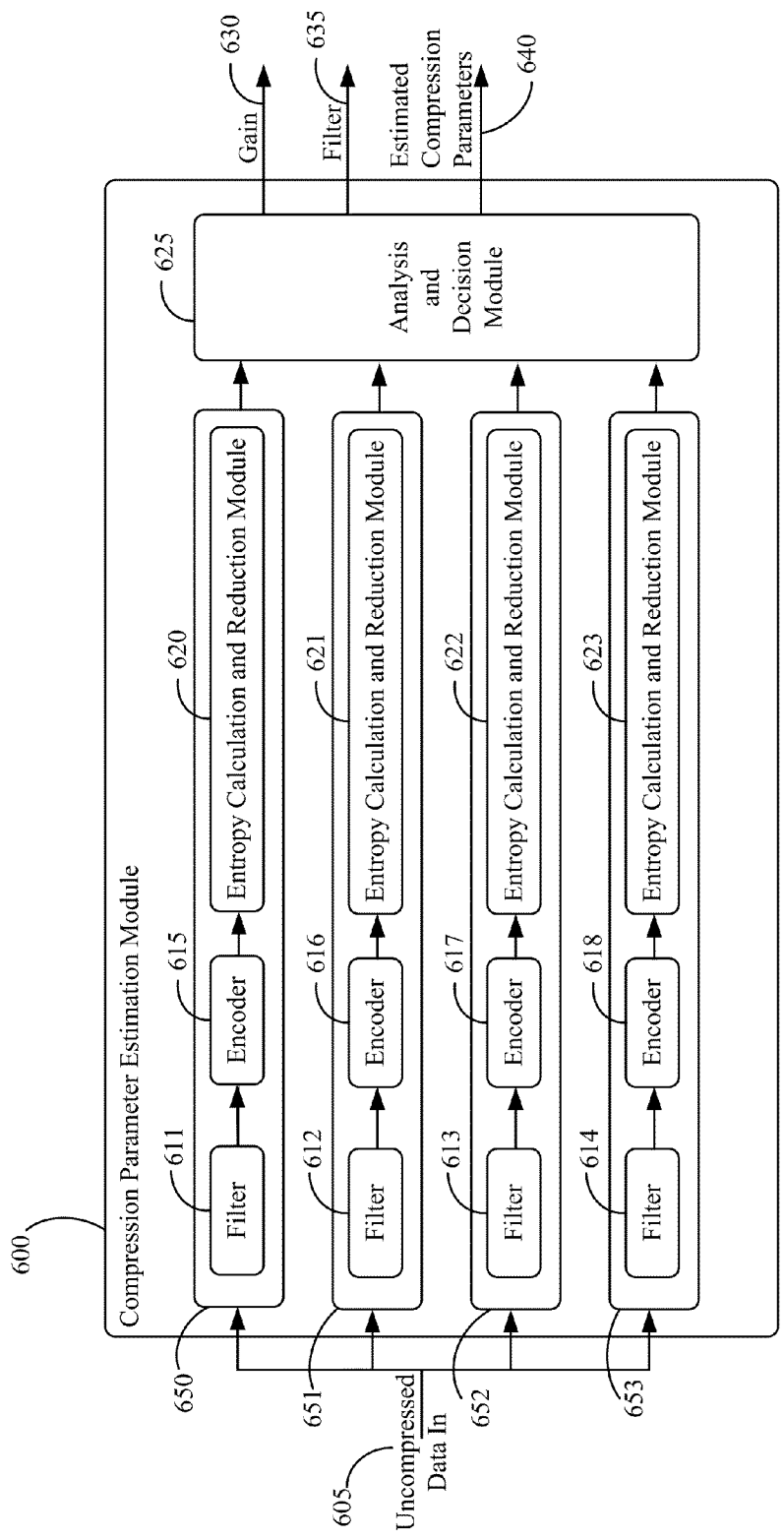
FIG. 6 is a block diagram illustrating a compression parameter estimation module in accordance with an embodiment of the present invention.

With reference to FIG. 6, in accordance with an embodiment of the present invention the compression parameter estimation module 600 of the compressor includes a plurality of compression parameter estimation paths 650, 651, 652, 653. In this specific embodiment, four compression parameter estimation paths are illustrated, however this is not meant to be limiting and greater or fewer estimation paths may be included in the compression parameter estimation module 600 of the present invention.

Each of the compression parameter estimation paths 650, 651, 652, 653 may be associated with an nth-order derivative and as such, each of the compression parameter estimation paths may comprise one of a plurality of filters 611, 612, 613, 614. Each of the plurality of filters 611, 612, 613, 614 may be designed to filter the uncompressed data 605 in accordance with the associated nth-order derivative. After the uncompressed data 605 is received at the compression parameter estimation module 600, the uncompressed data 605 may be processed by each of the plurality of compression parameter estimation paths 650, 651, 652, 653 in parallel. The output of each of the plurality of filters may be a plurality of filtered uncompressed data signals, each of the resulting filtered uncompressed data signals having a unique filter parameter determinant upon which of the plurality of filters 611, 612, 613, 614 filtered the uncompressed data 605. Each of the plurality of filtered uncompressed data signals may then be provided to one of a plurality of encoders 615, 616, 617, 618, wherein each compression parameter estimation path 650, 651, 652, 653 comprises one of the plurality of encoders 615, 616, 617, 618. Each of the plurality of encoders 615, 616, 617, 618 may be programmed to encode the filtered uncompressed data utilizing one of a plurality of encoding techniques currently known in the art. The filtered and encoded data from each of the plurality of encoders 615, 616, 617, 618 may then be provided to one of a plurality of entropy calculation and reduction modules 620, 621, 622, 623, wherein each compression parameter estimation paths 650, 651, 652, 653 comprises one of the plurality of entropy calculation and reduction modules 620, 621, 622, 623. Each of the plurality of entropy calculation and reduction modules 620, 621, 622, 623 may be programmed to calculate the entropy of the filtered and encoded data and to reduce the entropy of the data as necessary utilizing one of a plurality of entropy calculation and reduction techniques currently known in the art. In one embodiment, the entropy calculation and reduction modules 620, 621, 622, 623 identify signal energy and packet size and perform energy correction based on signal characteristics.

In operation, the uncompressed data 605 may be received at the compression parameter estimation module 600 and may be processed by each of the plurality of compression parameter estimation paths 650, 651, 652, 653 in parallel. The resulting data from each of the plurality of compression parameter estimation paths 650, 651, 652, 653 may then be provided to the analysis and decision module 625. The analysis and decision module 625 may evaluate the jitter and achieved compression associated with each of the plurality of compression parameter estimation paths 650, 651, 652, 653. Based upon the evaluation, the analysis and decision module 625 may then select which of the plurality of compression parameter estimation paths 650, 651, 652, 653 provided the data that most closely meets the desired performance level of the compressor.

As such, the analysis and decision module 625 identifies the combination of filter, encoder, entropy calculation and reduction that most closely meets the desired performance level of the compressor. In this way, the analysis and decision module 625 identifies the best compression parameter estimation path and generates a set of parameters to be used for compression. The analysis and decision module 625 may then provide the compression parameters associated with the selected filtering, encoding and entropy calculation and reduction to the gain compensation module 515 and the compressed data packet generator 520 as previously described with reference to FIG. 5. The compression parameters may include a signal gain parameter 630, a filter parameter 635, and a plurality of additional estimated compression parameters 640 identifying the selected combination of filter, encoder and entropy calculation and reduction providing the desired performance level. The additional estimated compression parameters 640 may include a start of burst parameter and a packet size parameter.

In addition, if the performance level monitor 535 determines that the desired performance level has not been reached using the estimated compression parameters, then compression adjustment parameters 540 from the performance level monitor 535 may be provided to the analysis and decision module 625 to generate adjusted compression parameters.

Figure 7:
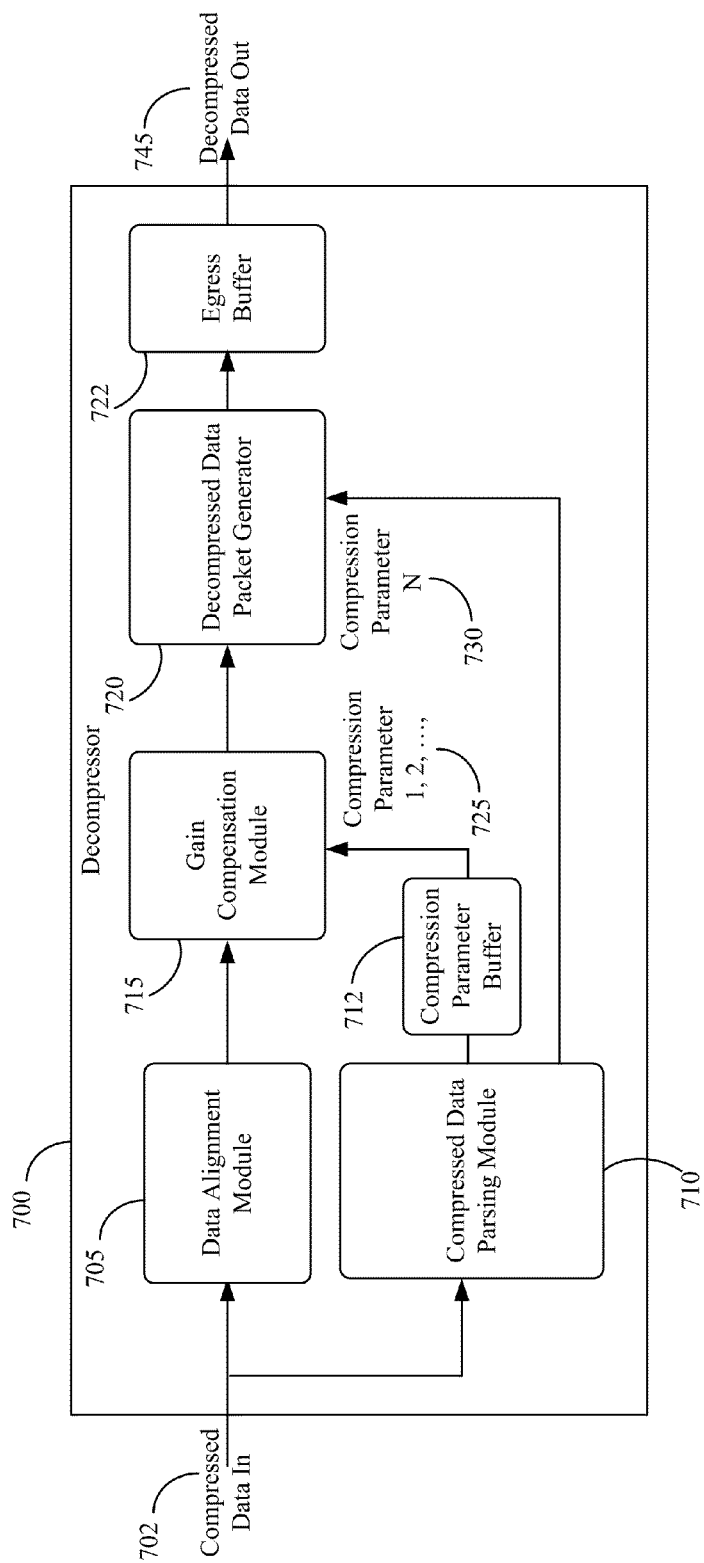
FIG. 7 is a block diagram illustrating a decompressor in accordance with an embodiment of the present invention.

With reference to FIG. 7, upon receipt of a compressed data packet 702 via the CPRI link, a decompressor 700 may be used to decompress the data packets. In this embodiment, the compressed data 702 may be received at a data alignment module 705 and a compressed data parsing module 710. The data alignment module 605 may be used to identify the alignment of the signal samples within the received compressed data 702. The compressed data parsing module 710 may be used to extract the compression parameters 725, 730 that were previously identified by the compressor 500 and utilized in the compression of the compressed data packet. The identified compression parameters may be stored in a compression parameter buffer 712 and may then be utilized by the gain compensation module 715 and the decompressed data packet generator 720 during the decompression of the data packet. After the data has been decompressed by the decompressed data packet generator 720, the decompressed data packet may be stored in an egress buffer 722 prior to transmission of the decompressed data 745 from the decompressor 700.

Figure 8:
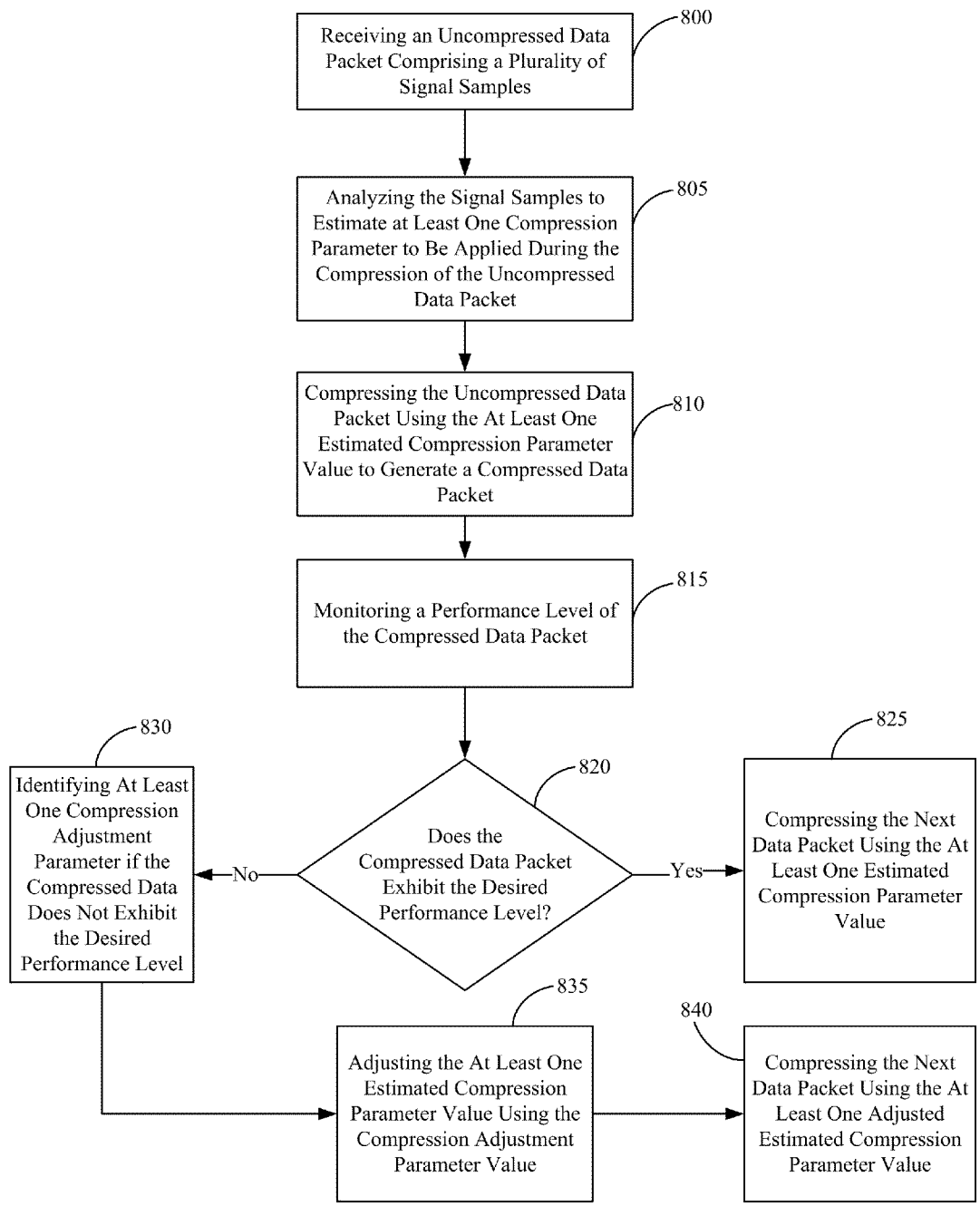
FIG. 8 is a flow diagram illustrating an embodiment of the present invention.

With reference to FIG. 8 and FIG. 5, a method of data compression in accordance with the present invention may include receiving an uncompressed data packet at a compressor 800 of a communication system. The compressor 500 may be located at a baseband unit or at one or more remote radio units as previously described. A compression parameter estimation module 510 of the compressor 500 may then analyze the signal samples of the data packet to estimate at least one compression parameter to be applied during the compression of the uncompressed data packet 805. After the compression parameters have been determined by the compression parameter estimation module 510, the compressed data packet generator 520 may compress the uncompressed data packet using the at least one estimated compression parameter 525, 530 to generate a compressed data packet 810.

Following the generation of the compressed data packet 810, the compressed data packets may be temporarily stored in the egress buffer 522 and a performance level monitor 535 of the compressor 500 may be used to monitor a performance level of the compressed data packet 715. If the performance level monitor 535 determines that the compressed data packet exhibits a desired performance level 820, the same estimated compression parameters will be used in the compression of the next data packet 825 received at the compressor 500. However, if the performance level monitor 535 determines that the compressed data packet does not exhibit a desired performance level 820, the performance level monitor 535 may identify one or more compression adjustment parameters 830. The compression parameter estimation module 510 may utilize the compression adjustment parameters 540 to adjust one or more of the estimated compression parameters 835, thereby providing one or more adjusted estimated compression parameter to be used in the generation of the next compressed data packet 840.

The compressor of the present invention may be used in the generation of compressed data packets for transmission within a communication system. In the present invention, the compression parameters used to generate the compressed data packet are adaptively adjusted based upon the current signal characteristics of the uncompressed data received at the compressor. As such, the present invention provides a method and apparatus for data compression that adapts to the continually changing, and often unpredictable, behavior of the received data signal over time, thereby providing a compressed data signal having a reasonable level of latency jitter and an acceptable level of performance degradation.

As is known in the art, the compressor may be implemented in a Field Programmable Gate Array (FPGA), an Application-Specific Integrated Circuit (ASIC) or a variety of other commonly known integrated circuit devices. The implementation of the invention may include both hardware and software components.

The invention claimed is:

1. A method for compressing data in a communication system, the method comprising:
   receiving an uncompressed data packet at a compressor of a communication system, the uncompressed data packet comprising a plurality of signal samples;
   processing each of the plurality of signal samples through a plurality of compression parameter estimation paths, in parallel by filtering each of the plurality of signal samples through one of a plurality of filters, encoding each of the plurality of filtered signal samples using one of a plurality of encoders, calculating entropy and entropy reduction for each of the plurality of filtered, encoded signal samples using one of a plurality of entropy calculation and reduction modules and identifying the combination of filtering, encoding and entropy calculation and entropy reduction that most closely meets a desired compression result to estimate at least one compression parameter to be applied during the compression of the uncompressed data packet;
   compressing the uncompressed data packet using the at least one estimated compression parameter to generate a compressed data packet;
   monitoring a performance level of the compressed data packet to determine if the compressed data packet exhibits a desired performance level;
   analyzing the compressed data packet to identify at least one compression adjustment parameter if the compressed data packet does not exhibit the desired performance level;
   adjusting the at least one estimated compression parameter using the compression adjustment parameter if the compressed data packet does not exhibit the desired performance level; and
   compressing the next data packet received at the compressor using the at least one adjusted compression parameter.

2. The method of claim 1, wherein the at least one estimated compression parameter is selected from the group consisting of a signal gain parameter, an encoding parameter, a filter parameter and an entropy reduction value parameter.

3. The method of claim 1, wherein the at least one compression adjustment parameter is selected from the group consisting of a buffer level and a number of bits per sample of the compressed packet.

4. The method of claim 1, further comprising aligning the received data packet prior to compressing the received data packet.

5. The method of claim 1, further comprising buffering the compressed data packet in an egress buffer.

6. The method of claim 1, further comprising adjusting the gain of the uncompressed data packet to maintain a desired signal-to-noise ratio.

7. The method of claim 1, further comprising compressing a next data packet received at the compressor using the at least one estimated compression parameter if the compressed data packet exhibits the desired performance level.

8. A compressor configured to compress data in a communication system, the compressor comprising:
   a compression parameter estimation module configured to receive an uncompressed data packet comprising a plurality of signal samples, the compression parameter estimation module including a plurality of compression parameter estimation paths operating in parallel, and an analysis and decision module configured to identify the compression parameter estimation path of the plurality of compression parameter estimation paths that most closely meets a desired performance level to estimate at least one compression parameter, each of the plurality of compression parameter estimation paths including a filter, an encoder and an entropy calculation and reduction module;
   a compressed data packet generator coupled to the compression parameter estimation module, the compressed data packet generator configured to receive the at least one estimated compression parameter and configured to compress the uncompressed data packet using the at least one estimated compression parameter to generate a compressed data packet; and
   a performance level monitor coupled to the compressed data packet generator and to the compression parameter estimation module, the performance level monitor configured to monitor the performance level of the compressed data packet to determine if the compressed data packet exhibits a desired performance level, configured to identify at least one compression adjustment parameter if the compressed data packet does not exhibit the desired performance level and configured to provide the at least one compression adjustment parameter to the compression parameter estimation module if the compressed data packet does not exhibit the desired performance level.

9. The compressor of claim 8, wherein the compression parameter estimation module is further configured to adjust the at least one estimated compression parameter using the compression adjustment parameter from the performance level monitor if the compressed data packet does not exhibit the desired performance level.

10. The compressor of claim 9, wherein the compressed data packet generator is further configured to compress the next data packet received at the compressor using the at least one adjusted estimated compression parameter.

11. The compressor of claim 8, wherein the at least one estimated compression parameter is selected from the group consisting of a signal gain parameter, an encoding parameter, a filter parameter and an entropy reduction value parameter.

12. The compressor of claim 8, further comprising a data alignment module configured to align the received data packet prior to compressing the received data packet.

13. The compressor of claim 8, further comprising a gain compensation module coupled to the compression parameter estimation module and the compressed data packet generator, the gain compensation module to adjust the gain of the uncompressed data packet to maintain a desired signal-to-noise ratio.

14. A compressor comprising:
  a data alignment module configured to receive an uncompressed data packet comprising a plurality of signal samples, and configured align the data in the uncompressed data packet;
  a compression parameter estimation module coupled to the data alignment module and configured to receive the uncompressed data packet, the compression parameter estimation module including a plurality of compression parameter estimation paths operating in parallel and configured to identify the compression parameter estimation path of the plurality of compression parameter estimation paths that most closely meets a desired performance level to estimate at least one compression parameter, each of the plurality of compression parameter estimation paths including a filter, an encoder and an entropy calculation and reduction module;
  a gain compensation module coupled to the compression parameter estimation module and to the data alignment module, the gain compensation module configured to receive aligned data from the data alignment module and to receive a signal gain parameter from the compression parameter estimation module and configured to reduce the amplitudes of the frequency domain coefficients of the aligned data in the uncompressed data packet;
  a compressed data packet generator coupled to the compression parameter estimation module and coupled to the gain compensation module, the compressed data packet generator configured to receive the at least one estimated compression parameter and to compress the uncompressed data packet using the at least one estimated compression parameter to generate a compressed data packet; and
  a performance level monitor coupled to the compressed data packet generator and to the compression parameter estimation module, the performance level monitor configured to monitor the performance level of the compressed data packet to determine if the compressed data packet exhibits a desired performance level and configured to identify at least one compression adjustment parameter if the compressed data packet does not exhibit the desired performance level.

15. The compressor of claim 14, wherein the compression parameter estimation module of the compressor is further configured to adjust the at least one estimated compression parameter using the compression adjustment parameter from the performance level monitor if the compressed data packet does not exhibit the desired performance level, wherein the compressed data packet generator of the compressor is further configured to compress the next data packet received at the compressor using the at least one adjusted estimated compression parameter, and further wherein the at least one compression adjustment parameter is selected from the group consisting of a buffer level and a number of bits per sample of the compressed packet.

16. The compressor of claim 14 wherein the entropy calculation and reduction module identifies signal energy and packet size and performs energy correction based on signal characteristics.

* * * * *